(12) United States Patent
Kabashima et al.

(10) Patent No.: US 7,708,935 B2
(45) Date of Patent: May 4, 2010

(54) FLOAT BATH BOTTOM REFRACTORY BRICK AND PROCESS FOR ITS PRODUCTION

(75) Inventors: Shuji Kabashima, Yokohama (JP); Kouzou Sakai, Yokohama (JP); Masamichi Yokotani, Yokohama (JP)

(73) Assignee: Asahi Glass Company, Limited, Tokyo (JP)

( * ) Notice: Subject to any disclaimer, the term of this patent is extended or adjusted under 35 U.S.C. 154(b) by 372 days.

(21) Appl. No.: 11/745,627

(22) Filed: May 8, 2007

(65) Prior Publication Data
US 2007/0238603 A1 Oct. 11, 2007

Related U.S. Application Data

(63) Continuation of application No. PCT/JP2005/020478, filed on Nov. 8, 2005.

(30) Foreign Application Priority Data

Nov. 9, 2004 (JP) .............................. 2004-325473

(51) Int. Cl.
C04B 35/18 (2006.01)
(52) U.S. Cl. ...................... 266/283; 266/286
(58) Field of Classification Search ................. 266/280, 266/283, 286
See application file for complete search history.

(56) References Cited

U.S. PATENT DOCUMENTS

| | | | |
|---|---|---|---|
| 5,407,875 A * | 4/1995 | Petschauer | .................. 501/127 |
| 5,420,087 A | 5/1995 | Wieland et al. | |
| 5,827,601 A | 10/1998 | Petschauer | |
| 5,941,043 A | 8/1999 | Petschauer | |
| 5,948,713 A | 9/1999 | Smiley et al. | |
| 6,171,990 B1 | 1/2001 | Petschauer | |
| 6,239,053 B1 * | 5/2001 | Petschauer et al. | .......... 501/128 |

FOREIGN PATENT DOCUMENTS

| | | |
|---|---|---|
| JP | 6-122543 | 5/1994 |
| JP | 6-340471 | 12/1994 |

(Continued)

OTHER PUBLICATIONS

O. Fervorner, et al., "Refractory materials for glass-melting furnaces", 1984, p. 68 (with partial English translation).

(Continued)

*Primary Examiner*—Scott Kastler
(74) *Attorney, Agent, or Firm*—Oblon, Spivak, McClelland, Maier & Neustadt, L.L.P.

(57) ABSTRACT

A process for producing a float bath bottom refractory brick which can suppress a reaction with $Na_2O$ from glass at the surface of the refractory brick and thereby prevent flaking phenomena, which process comprises adding a potassium compound to a clayey material comprising from 30 to 45 mass % of $Al_2O_3$ and from 50 to 65 mass % of $SiO_2$ and having a $Na_2O$ content of at most 1 mass %, so that the $K_2O$ content in the float bath bottom refractory brick to be produced would be from 2 to 4 mass %; and a refractory brick useful for a float bath bottom for production of plate glass by a float process.

15 Claims, 4 Drawing Sheets

FOREIGN PATENT DOCUMENTS

| | | |
|---|---|---|
| JP | 7-2536 | 1/1995 |
| JP | 7-109129 | 4/1995 |
| JP | 9-169578 | 6/1997 |
| JP | 9-178359 | 7/1997 |
| JP | 9-188579 | 9/1997 |
| JP | 2000-63133 | 2/2000 |
| JP | 2000-72534 | 3/2000 |
| JP | 2003-261339 | 9/2003 |
| JP | 2003-267739 | 9/2003 |
| JP | 2003-277134 | 10/2003 |

OTHER PUBLICATIONS

A. G. Betehtin, "Course of Mineralogy", State publishing house of geological literature, 1951, pp. 448-449 (with partial English translation).

Yoneyama et al, Refractories, 2000, vol. 52, No. 5, pp. 280-284.

* cited by examiner

US 7,708,935 B2

FLOAT BATH BOTTOM REFRACTORY BRICK AND PROCESS FOR ITS PRODUCTION

TECHNICAL FIELD

The present invention relates to a refractory brick to be used for the bottom of a float bath i.e. a tin bath in float process for production of plate glass, and a process for its production.

BACKGROUND ART

In production of plate glass by float process, a float bath on which molten glass is discharged from a glass melting furnace and formed into a ribbon, comprises a metal casing lined with a refractory brick, and is filled with molten tin. Glass molten in the melting furnace is discharged on the surface of the tin bath, flows on the tin bath and advances to be formed into smooth plate glass. As usual plate glass (soda lime glass) for buildings, automobiles, etc., glass containing about 15 mass % of $Na_2O$ is used. Such glass is in contact with the molten tin at its bottom surface, and at the interface, $Na_2O$ in the glass diffuses into the tin bath. As a bottom refractory brick for such a float bath, Chamotte brick containing $Al_2O_3$ and $SiO_2$ as the main components and having a mineral phase mainly comprising Mullite and Cristobalite is employed in view of characteristics, usefulness, cost, etc.

$Na_2O$ contained in the glass infiltrates from the surface of the float bath bottom refractory brick into its inside via the tin bath to form Nepheline, thereby to form a metamorphic phase different from the matrix of the refractory brick. The metamorphic phase increases in thickness with time in a direction perpendicular to the surface of the tin bath. Since Nepheline has a thermal expansion coefficient about three times as high as that of Mullite, peeling of the metamorphic phase from the matrix due to volume expansion of the metamorphic phase or due to thermal stress accompanying the change in temperature conditions of the float bath, i.e. so called flaking phenomena occur. The flakes, which have a specific gravity smaller than that of the molten tin, float up in the tin bath and scar the glass or generate foreign matters, and they can be a major cause of inhibiting smooth production of plate glass.

Heretofore, as a float bath bottom refractory brick which inhibits such flaking phenomena, one having a total alkali metal content up to 3% to a clay portion (Patent Document 1) and one employing a silicate material containing an alkali oxide having a particle diameter of at most 0.09 mm in an amount of from 1 to 3 mass % (Patent Document 2) have been disclosed. However, specifically, they contain two alkali oxides i.e. from 0.1 to 0.4% of $Na_2O$ and from 0.8 to 1.2% of $K_2O$, and they will not contain 2% or more of $K_2O$. Further, one employing a material having a particle diameter of at most 90 μm, which has a total content of $Na_2O$ and $K_2O$ of at most 1 mass % (Patent Document 3) and the like have been known. However, no document discloses effects of $K_2O$ as disclosed in the present invention.

Patent Document 1: JP-A-6-122543
Patent Document 2: JP-A-6-340471
Patent Document 3: JP-A-2003-277134

DISCLOSURE OF THE INVENTION

Problems that the Invention is to Solve

It is an object of the present invention to provide a process for suitably producing a float bath bottom refractory brick for production of glass plate which suppresses the above-described flaking phenomena and which is free from defects such as scars and foreign matters. Further, it is to provide a float bath bottom refractory brick which can suppress the above-described flaking phenomena, and a float bath employing the above float bath bottom refractory brick. Further, it is to provide a process for producing glass by means of a float bath employing the above float bath bottom refractory brick.

Means of Solving the Problems

The present invention has been made to achieve the above objects, and provides a process for producing a float bath bottom refractory brick, which comprises adding a potassium compound to a clayey material comprising, as represented by mass percentage based on the following oxides, from 30 to 45% of $Al_2O_3$ and from 50 to 65% of $SiO_2$, followed by firing.

The present invention further provides a process for producing a float bath bottom refractory brick, which comprises using a clayey material comprising, as represented by mass percentage based on the following oxides, from 30 to 45% of $Al_2O_3$ and from 50 to 65% of $SiO_2$ and having a $Na_2O$ content of at most 1%, wherein a potassium compound is added so that the $K_2O$ content in the float bath bottom refractory brick to be produced would be from 2 to 4%.

The present invention further provides a process for producing a float bath bottom refractory brick, which comprises adding a potassium compound to a clayey material comprising, as represented by mass percentage based on the following oxides, from 30 to 45% of $Al_2O_3$ and from 50 to 65% of $SiO_2$, kneading, molding, firing and then crushing the material to obtain a granular refractory material, kneading the granular refractory material, and molding it, followed by firing, wherein control is made so that in a fine granular portion having a grain size less than 90 μm in the above granular refractory material, the $K_2O$ content would be from 2 to 4%, and the $Na_2O$ content would be at most 1%.

The present invention further provides the above process for producing a float bath bottom refractory brick, wherein the granular refractory material contains from 20 to 60 mass % of a fine granular portion having a grain size less than 90 μm which contains from 2 to 4% of $K_2O$ and at most 1% of $Na_2O$.

The present invention further provides the above process for producing a float bath bottom refractory brick, wherein control is made so that in a medium granular portion having a grain size of from 90 μm to 1 mm and a fine granular portion having a grain size less than 90 μm in the above granular refractory material, as represented by mass percentage based on the following oxides, the $K_2O$ content would be from 2 to 4%, and the $Na_2O$ content would be at most 1%.

The present invention further provides the above process for producing a float bath bottom refractory brick, wherein the granular refractory material contains from 20 to 60 mass % of the medium granular portion having a grain size of from 90 μm to 1 mm.

The present invention further provides the above process for producing a float bath bottom refractory brick, which comprises kneading, molding, firing and then crushing a clayey material comprising, as represented by mass percentage based on the following oxides, from 30 to 45% of $Al_2O_3$ and from 50 to 65% of $SiO_2$, to obtain a granular refractory material, adding a granular potassium compound to the granular refractory material, kneading, molding and firing the mixture, wherein control is made so that the $K_2O$ content in the float bath bottom refractory brick to be produced, would be from 2 to 4%.

The present invention further provides a float bath bottom refractory brick having a composition which comprises, as represented by mass percentage based on the following oxides, from 30 to 45% of $Al_2O_3$, from 50 to 65% of $SiO_2$, at most 1% of $Na_2O$ and from 2 to 4% of $K_2O$.

The present invention further provides the above float bath bottom refractory brick, which has at most 10% of a Cristobalite crystalline phase.

The present invention further provides the above float bath bottom refractory brick, which has at least 20% of a Mullite crystalline phase.

The present invention further provides a float bath having a bottom made of the above brick.

The present invention further provides a process for producing plate glass, which comprises using the above float bath.

EFFECTS OF THE INVENTION

The float bath bottom refractory brick to be produced by the present invention has a glass phase rich in $K_2O$. Therefore, infiltration of $Na_2O$ from the surface of the refractory brick into the inside via the tin bath can be suppressed, whereby formation of Nepheline can be suppressed. Further, the glass phase absorbs volume expansion of the formed Nepheline metamorphic phase and suppresses flaking phenomena. Accordingly, the life of a float bath employing the float bath bottom refractory brick can be prolonged. Further, in a process for producing plate glass employing the float bath, defects (scars) of glass accompanying the flaking phenomena can be reduced, whereby improvement in quality and rate of non-defective products will be achieved.

BEST MODE FOR CARRYING OUT THE INVENTION

Figure 1:
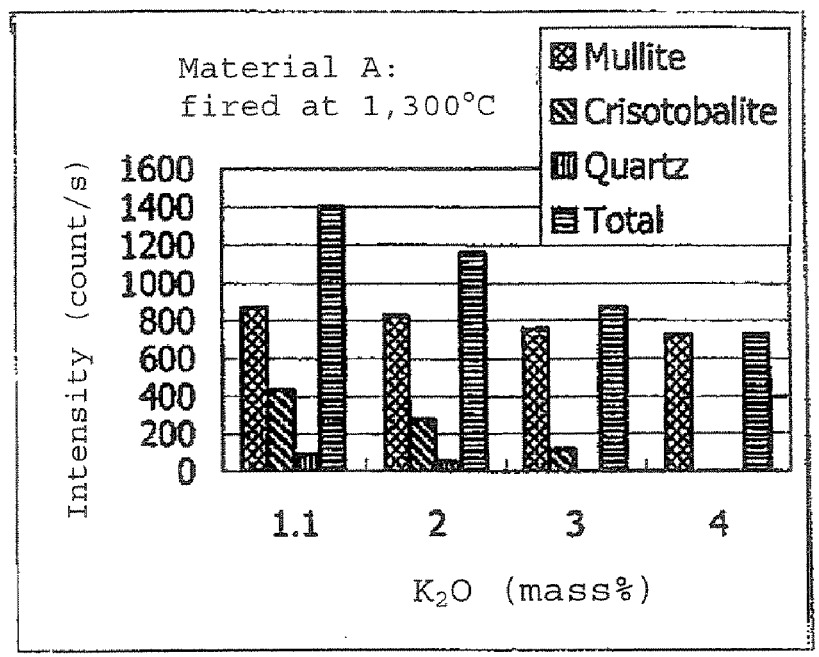
FIG. 1 illustrates results of X-ray diffraction measurement in a case where a molded product of Example 1 is fired at 1,300° C.

As a raw material of the float bath bottom refractory brick of the present invention, a clayey material comprising, as represented by mass percentage of the following oxides, from 30 to 45% of $Al_2O_3$ and from 50 to 65% of $SiO_2$ is employed. For the float bath bottom refractory brick, as a clayey material, one having a $Na_2O$ content of at most 1% is used so as to reduce infiltration of the sodium component from glass diffused in the tin bath. In description of the composition in the present invention, % represents mass % unless otherwise specified.

As an additive to be a $K_2O$ source in the present invention, various potassium compounds may be used, and it is preferred to use potassium carbonate which is easily available at a relatively low cost. If the $K_2O$ content is less than 2 mass %, the proportion of Cristobalite tends to be large, whereby it tends to be difficult to suppress the rate of infiltration of $Na_2O$ from glass into the refractory brick via the tin bath, and it tends to be difficult to prevent flaking phenomena. On the other hand, if the $K_2O$ content exceeds 4 mass %, the Mullite phase after firing tends to reduce, and the glass phase tends to increase correspondingly, whereby high temperature properties of the refractory brick tend to be impaired.

As a specific process of using a clayey material comprising from 30 to 45% of $Al_2O_3$ and from 50 to 65% of $SiO_2$ and having a $Na_2O$ content of at most 1%, and adding a potassium compound so that the $K_2O$ content in the float bath bottom refractory brick to be produced would be from 2 to 4%, a process of adding a potassium compound as a $K_2O$ source to the above clayey material comprising from 30 to 45% of $Al_2O_3$ and from 50 to 65% of $SiO_2$, kneading, molding, firing and then crushing the material to obtain a granular refractory material, kneading the granular refractory material, molding it into a shape of desired float bath bottom refractory brick, followed by firing to produce a float bath bottom refractory brick (hereinafter referred to as a first production process) and a process for producing a float bath bottom refractory brick, which comprises adding a granular potassium compound to the clayey material comprising from 30 to 45% of $Al_2O_3$ and from 50 to 65% of $SiO_2$, kneading and molding the mixture into a shape of a desired float bath bottom refractory brick, followed by firing (hereinafter referred to as a second production process) may, for example, be mentioned. However, the method is not limited thereto.

In a case where $K_2O$ is contained in the clayey material in a small amount, the addition amount of the potassium compound is adjusted so that the $K_2O$ content in the float bath bottom refractory brick to be produced would be from 2 to 4% considering the content of the $K_2O$ contained.

With respect to the reaction with $Na_2O$ at the surface of the float bath bottom refractory brick, as described above, the reaction rate with $Na_2O$ is suppressed by use of the material containing from 2 to 4% of $K_2O$, and the larger the specific surface area of the particles, the higher the reactivity. On the other hand, the float bath bottom refractory brick is produced by kneading, molding and firing a granular refractory material for production of the brick, and in view of characteristics required for the refractory brick to be produced, usually as the granular refractory material, one containing from 20 to 60% of a fine granular portion having a grain size less than 90 µm, from 20 to 60% of a medium granular portion having a grain size of from 90 µm to 1 mm and from 20 to 60% of a coarse granular portion having a grain size exceeding 1 mm, is usually used. With respect to a float bath bottom refractory block produced by using such a granular refractory material, a portion comprising the fine granular portion is most likely to be infiltrated and eroded by the sodium component from glass diffused in the tin bath, the medium granular portion is second likely to be eroded, and the coarse granular portion is relatively less likely to be eroded. Accordingly, in order to reduce particularly the infiltration of sodium, it is preferred to use a granular refractory material controlled so that in the fine granular portion having a grain size less than 90 µm, the $K_2O$ content would be from 2 to 4% and the $Na_2O$ content would be at most 1%. Further, it is more preferred to employ one controlled so that in the fine granular portion having a grain size less than 90 μm and in the medium granular portion having a grain size of from 90 μm to 1 mm, the $K_2O$ content would be from 2 to 4% and the $Na_2O$ content would be at most 1%. It is more preferred to employ one controlled so that in the coarse granular portion having a grain size exceeding 1 mm, the $K_2O$ and $Na_2O$ contents are as defined above, that is, in all granular portions, the $K_2O$ content would be from 2 to 4% and the $Na_2O$ content would be at most 1%. As mentioned above, by use of a refractory brick having a fine granular portion comprising the above material, for the float bath bottom, the rate of formation of Nepheline at the surface can be suppressed, and flaking phenomena can preferably be prevented.

In the first production process, it is preferred that the granular refractory material containing the $K_2O$ source is kneaded, molded and dried, and then the resulting molded product is fired at a temperature of from 1,200° C. to 1,400° C. If the molded product is fired at a temperature lower than 1,200° C., the fired product will not be stable in terms of mineral phase, and if it is fired at a temperature higher than 1,400° C., the Mullite phase after firing tends to be small, specifically, the proportion of the Mullite crystalline phase will be less than 20%, and the glass phase tends to excessively increase correspondingly, whereby high temperature properties of the refractory brick may be impaired. The fired molded product is crushed by a crusher and classified into coarse particles having grain sizes exceeding 1 mm, medium particles having grain sizes of from 90 μm to 1 mm and fine particles having grain sizes less than 90 μm. In such a manner, a material for production of a float bath bottom refractory brick, controlled so than the $K_2O$ content would be from 2 to 4 mass %, is obtained. Then, the material is kneaded and molded into a shape of a desired float bath bottom refractory brick, dried and fired at a temperature within a range of from 1,200° C. to 1,400° C. to obtain a float bath bottom refractory brick.

In the second production process, in a case where the clayey material is kneaded, molded, fired and then crushed to obtain a granular refractory material, to which a granular potassium compound as a $K_2O$ source is added, the additive as the $K_2O$ source has to be uniformly dispersed in the $Al_2O_3$—$SiO_2$ clayey material, and accordingly the particles size is preferably at least matched to the particles size of the material. More preferably, the additive as the $K_2O$ source is preliminarily finely pulverized to a particle size smaller than that of the fine granular portion of the material and then kneaded with the clayey material.

When the clayey material originally contains a desired amount of $K_2O$, namely, when a clayey material comprising from 30 to 45% of $Al_2O_3$, from 50 to 65% of $SiO_2$, at most 1% of $Na_2O$ and from 2 to 4% of $K_2O$ is used to produce a float bath bottom refractory brick, which is used for the float bath bottom, the rate of formation of Nepheline at the surface can be suppressed, and flaking phenomena can preferably be prevented.

In the float bath bottom refractory brick comprising, on the basis of the following oxides, from 30 to 45% of $Al_2O_3$, from 50 to 65% of $SiO_2$ and at most 1% of $Na_2O$, a proportion of the Cristobalite crystalline phase higher than 10% means a relatively small amount of the glass phase in the refractory brick, and absorption of volume expansion of Nepheline formed on the surface by a reaction with $Na_2O$ from glass infiltrated into the refractory brick via the tin bath, by the glass phase, tends to be difficult, and prevention of flaking phenomena tends to be difficult, such being unfavorable.

The proportion of the Cristobalite crystalline phase is represented by the percentage of (the mass of Cristobalite)/{(the mass of Cristobalite)+(the mass of Mullite)}, and the mass of Cristobalite and the mass of Mullite can be obtained by employing analytical curves preliminarily prepared from intensity peaks of Cristobalite and Mullite measured by an X-ray diffraction apparatus (θ/2θ method, Cu-Kα1 rays).

As a measurement method by an X-ray diffraction apparatus, the intensity peak of a powdered sample is measured by a powder X-ray diffraction apparatus, which is compared with an analytical curve preliminarily prepared by peak intensities of samples having the proportions of Cristobalite and Mullite changed in five stages, thereby to determine the proportion.

On the other hand, in the float bath bottom refractory brick, a proportion of the Mullite crystalline phase less than 20% means a relatively large amount of the glass phase in the refractory brick, and in such a case, high temperature properties of the refractory brick tend to be impaired.

The proportion of the Mullite crystalline phase is represented by the percentage of (the mass of Mullite)/{(the mass of Cristobalite)+(the mass of Mullite)}, and the mass of Cristobalite and the mass of Mullite are measured by the above-described method of employing an X-ray diffraction apparatus.

If a large brick such as the float bath bottom refractory brick is produced by press molding by means of e.g. an oil hydraulic press, laminar defects (lamination) may form in a plane direction perpendicular to the direction of the pressure. If the refractory brick is used for the float bath bottom in a state where the defects are in parallel with glass in the float bath, peeling of Nepheline formed by a reaction with $Na_2O$ from glass infiltrated into the refractory brick via the tin bath from the surface of the refractory brick due to its volume expansion, i.e. flaking phenomena may be more accelerated. Accordingly, the direction of pressure at the time of press molding is preferably such a direction that the possible direction of lamination would be perpendicular to glass in the float bath, considering the direction of installation of the refractory brick in the float bath.

The float bath bottom refractory brick produced by any one of the above processes preferably have a porosity within a range of from 15 to 20%, a bulk specific gravity within a range of from 2.1 to 2.3 and a compressive strength within a range of from 30 to 70 MPa, so as to satisfy mechanical strength, etc. as a structure.

Further, in the float bath for production of plate glass employing the above float bath bottom refractory brick, flaking phenomena of the float bath bottom refractory brick can be suppressed, that is, the life of the float bath bottom refractory brick can be prolonged, whereby the time period until the float bath bottom refractory brick is exchanged with the float bath shut down, will be prolonged. Accordingly, the efficiency of the float bath will improve, and the cost for exchange relative to the operation time, can be suppressed to be relatively low.

Further, in the process for producing glass employing the float bath employing the above float bath bottom refractory brick, defects (scars) of glass accompanying flaking phenomena are reduced, the quality tends to improve, and the rate of non-defective products tends to increase. Accordingly, the cost for production of glass can be suppressed low.

EXAMPLES

Now, the present invention will be explained in further detail with reference to Examples and Comparative Examples.

With respect to an X-ray diffraction measurement method, measurement was carried out by means of X Pert-MPD (θ/2θ method, Cu-Kα1 rays) manufactured by PHILIPS employing a powder as a sample. Five types of samples with ratios of Mullite to Cristobalite of 100:0, 75:25, 50:50, 25:75 and 0:100 were preliminarily subjected to measurement to obtain an analytical curve from the ratios and the X-ray peak intensities.

Chemical analysis values of $Al_2O_3$—$SiO_2$ materials used in Examples 1 and 2, as represented by mass percentage based on oxides, are shown in Table 1. The clayey material of the material A contains 1.1 mass % of $K_2O$, and the clayey material of the material B contains 0.3 mass % of $K_2O$.

TABLE 1

|  | Material A | Material B |
|---|---|---|
| $SiO_2$ | 56.3 | 62.2 |
| $Al_2O_3$ | 40.0 | 33.6 |
| $Fe_2O_3$ | 1.4 | 1.1 |
| $TiO_2$ | 0.6 | 1.9 |
| CaO | 0.1 | 0.3 |
| MgO | 0.5 | 0.3 |
| $Na_2O$ | 0.0 | 0.1 |
| $K_2O$ | 1.1 | 0.3 |
|  | 100 | 100 |

Example 1

To 10 g of the clayey material A, potassium carbonate as a $K_2O$ source was added in an amount of not added (1.1%), 2, 3 or 4% as calculated as $K_2O$ mass % after mixing. The material having no potassium carbonate added corresponds to sample 1 (Comparative Example 1), and mixtures having potassium carbonate added in an amount of 2%, 3% and 4% correspond to sample 2 (Example 1), sample 3 (Example 1) and sample 4 (Example 1), respectively. As potassium carbonate, one preliminarily pulverized in a mortar was employed. Kneading was carried out in a mortar. The kneaded product was put in a mold, and molded into pellets by means of a pressing machine. The molded product was fired at 1,300° C. for 24 hours.

The fired product was crushed into granules, and the obtained granular refractory material was kneaded, molded into two molded products with a shape of a desired float bath bottom refractory brick, and the two molded products were dried and fired at 1,300° C. and 1,350° C., respectively, to obtain two types of float bath bottom refractory brick. The granular refractory material comprised 30% of a fine granular portion having a grain size less than 90 μm, 30% of a medium granular portion having a grain size of from 90 μm to 1 mm and 40% of a coarse granular portion having a grain size exceeding 1 mm. The composition of the prepared brick is substantially the same as the composition of the material.

Figure 2:
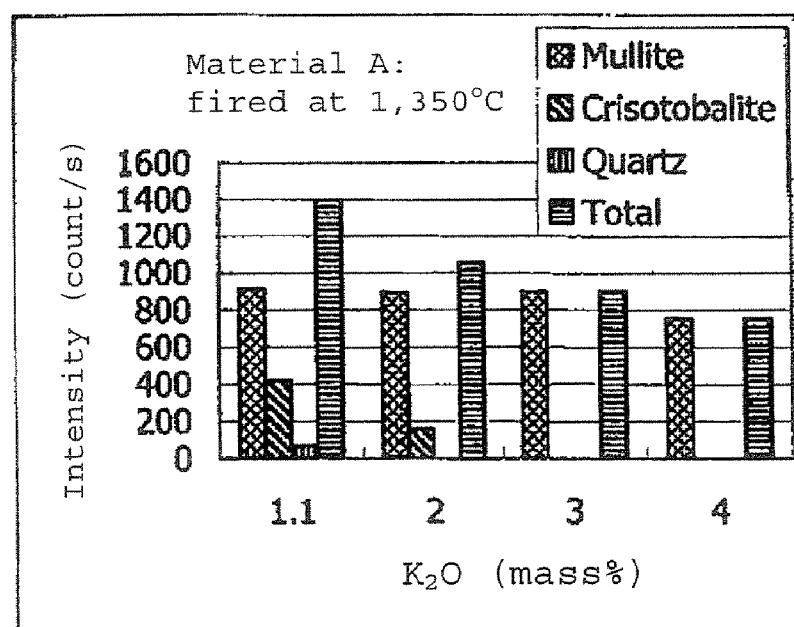
FIG. 2 illustrates results of X-ray diffraction measurement in a case where a molded product of Example 1 is fired at 1,350° C.
Figure 3:
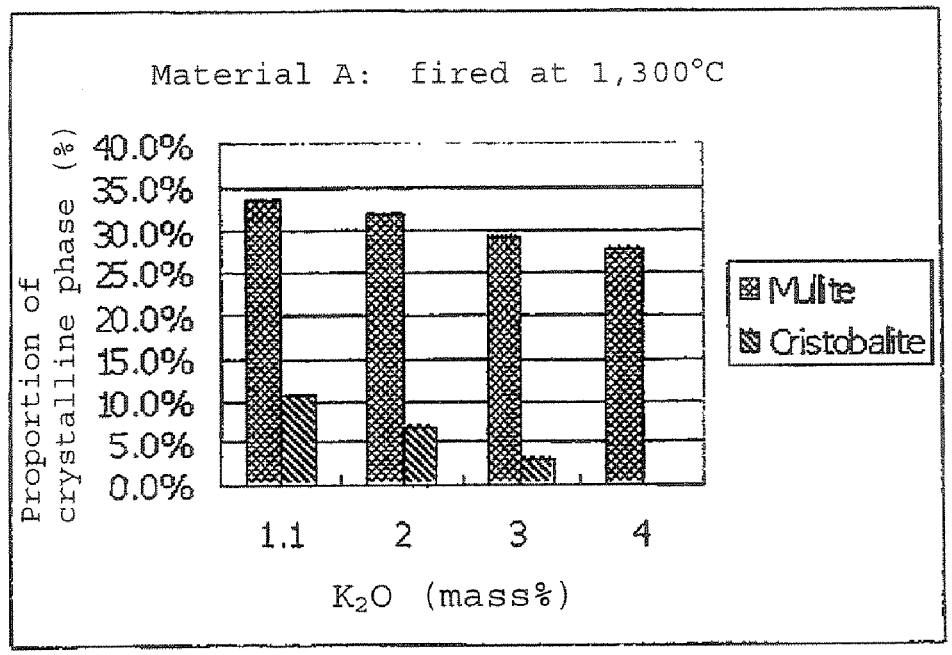
FIG. 3 illustrates proportions of crystalline phases in a case where a molded product of Example 1 is fired at 1,300° C.
Figure 4:
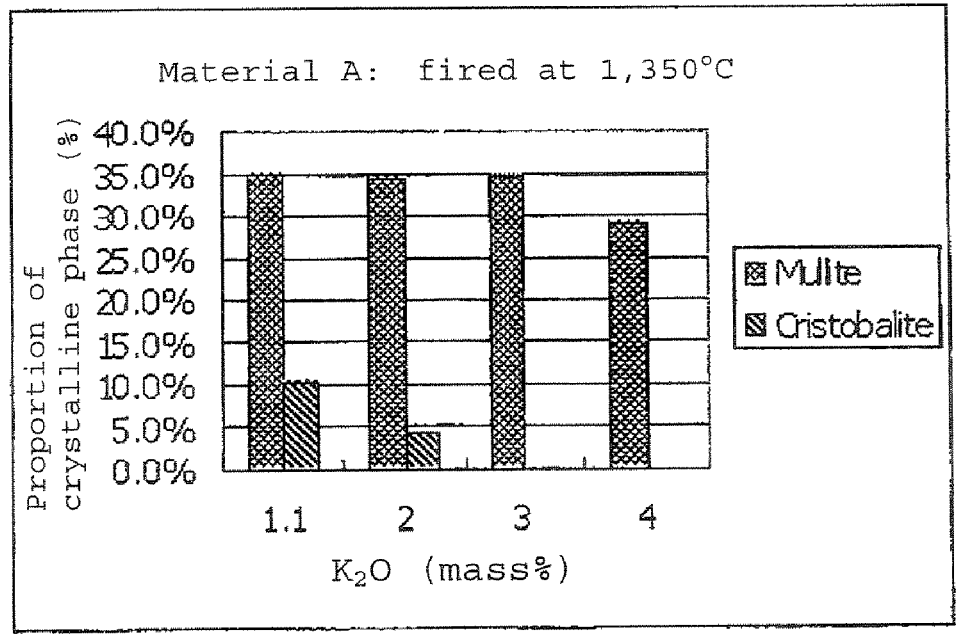
FIG. 4 illustrates proportions of crystalline phases in a case where a molded product of Example 1 is fired at 1,350° C.

Results of X-ray diffraction measurement of test specimens of the obtained float bath bottom refractory brick and proportions of crystalline phases are shown in FIGS. 1, 2, 3 and 4. FIG. 1 illustrates results of X-ray diffraction measurement with respect to test specimens obtained by firing the molded products at 1,300° C., FIG. 2 illustrates results of X-ray diffraction measurement with respect to test specimens obtained by firing the molded products at 1,350° C. FIG. 3 illustrates proportions of crystalline phases with respect to test specimens obtained by firing the molded products at 1,300° C., and FIG. 4 illustrates proportions of crystalline phases with respect to test specimens obtained by firing molded products at 1,350° C. The vertical axis represents the peak intensity of each crystal, and the horizontal axis represents mass % of $K_2O$.

It is confirmed from FIGS. 1 and 2 that the peak intensities representing the proportions of Cristobalite and quartz decrease, as the mass % of $K_2O$ increases to 2, 3 and 4% (Example 1) as compared with no potassium carbonate is added (proportion of the Cristobalite crystalline phase is 11%) (Comparative Example 1). Further, it is confirmed that the proportion of the cristobalite crystalline phase also decreases. Such phenomena indicate that a glass phase rich in $K_2O$ increases, which suppresses a reaction with $Na_2O$ at the surface of the refractory brick to be used for a float bath bottom.

Further, as evident from FIGS. 3 and 4, the proportion of the Cristobalite crystalline phase exceeds 10% in a case where no potassium carbonate is added (Comparative Example 1), and the proportion of the Cristobalite crystalline phase is less than 10% in a case where potassium carbonate is added so that the mass % of $K_2O$ would be 2, 3 or 4% (Example 1).

Accordingly, it is estimated that flaking phenomena can be suppressed by use of the float bath bottom refractory brick of Example 1.

Example 2

In the same manner as in Example 1, to 10 g of the clayey material B, potassium carbonate as a $K_2O$ source was added in an amount of 0.3 (not added), 2, 3, 4 or 6% as calculated as $K_2O$ mass % after mixing. The material having no potassium carbonate added corresponds to sample 5 (Comparative Example 2), and mixtures having potassium carbonate added in an amount of 2%, 3%, 4% and 6% correspond to sample 6 (Example 2), sample 7 (Example 2), sample 8 (Example 2) and sample 9 (Comparative Example 3), respectively. As potassium carbonate, one preliminarily pulverized in a mortar was employed. Kneading was carried out in a mortar. The kneaded product was put in a mold and molded into pellets by means of a pressing machine. The molded product was fired at 1,300° C. for 24 hours.

The fired product was crushed into granules, and the obtained granular refractory material was kneaded and molded into two molded products with a shape of a desired float bath bottom refractory brick, and the two molded products were dried and fired at 1,300° C. and 1,350° C., respectively, to obtain two types of float bath bottom refractory brick. The above granular refractory material comprised 30% of a fine granular portion having a grain size less than 90 μm, 30% of a medium granular portion having a grain size of from 90 μm to 1 mm and 40% of a coarse granular portion having a grain size exceeding 1 mm. The composition of the obtained brick is substantially the same as the composition of the material.

Figure 5:
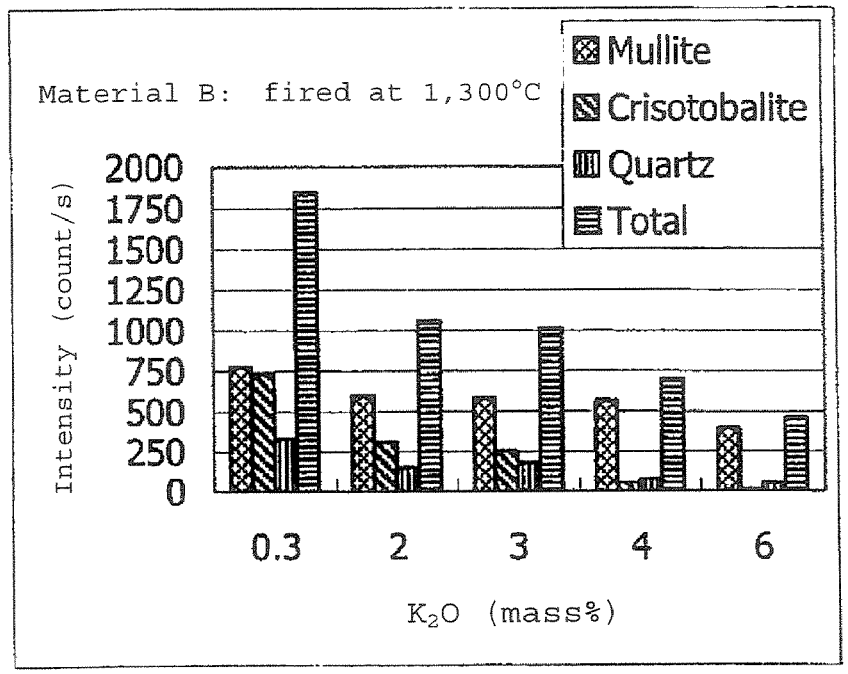
FIG. 5 illustrates results of X-ray diffraction measurement in a case where a molded product of Example 2 is fired at 1,300° C.
Figure 6:
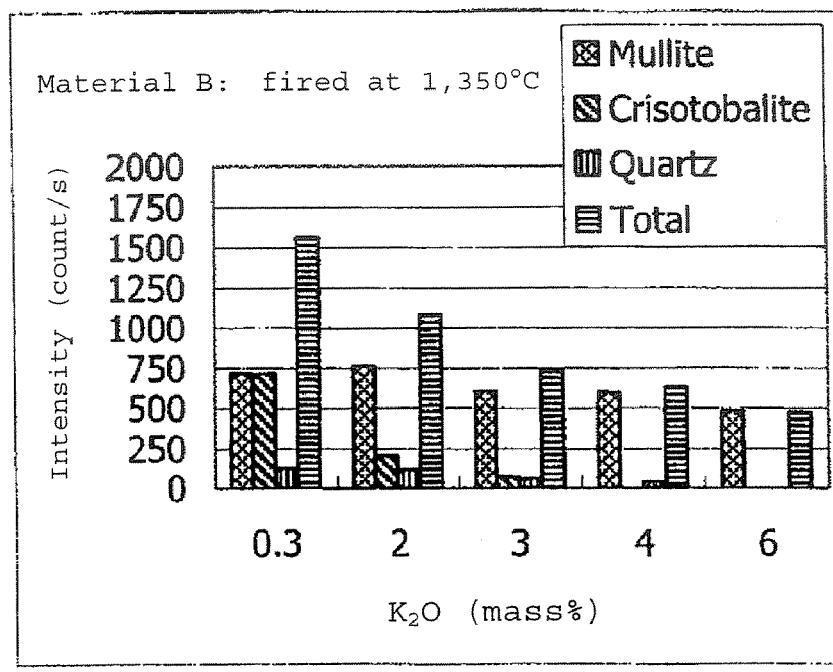
FIG. 6 illustrates results of X-ray diffraction measurement in a case where a molded product of Example 2 is fired at 1,350° C.
Figure 7:
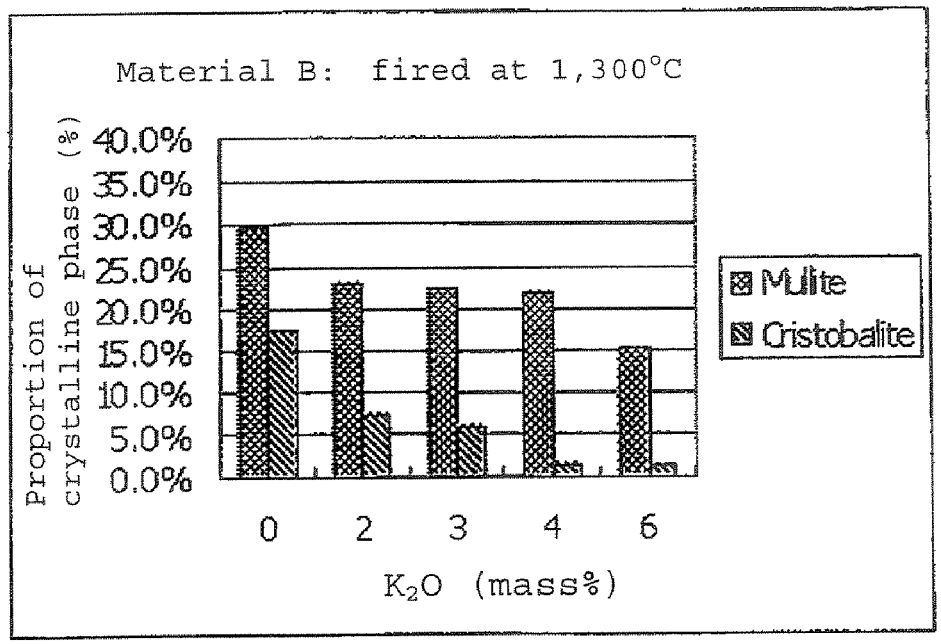
FIG. 7 illustrates proportions of crystalline phases in a case where a molded product of Example 2 is fired at 1,300° C.
Figure 8:
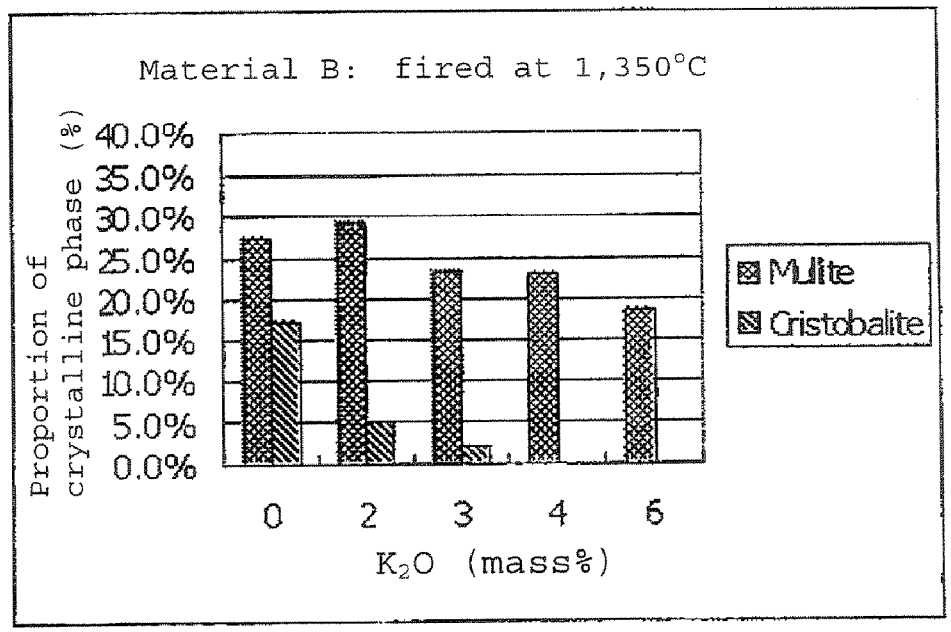
FIG. 8 illustrates proportions of crystalline phases in a case where a molded product of Example 2 is fired at 1,350° C.

Results of X-ray diffraction measurement with respect to test specimens of the obtained float bath bottom refractory brick and proportions of crystalline phases are shown in FIGS. 5, 6, 7 and 8. FIG. 5 illustrates results of X-ray diffraction measurement with respect to test specimens obtained by firing the molded products at 1,300° C., and FIG. 6 illustrates results of X-ray diffraction measurement with respect to test specimens obtained by firing the molded product at 1,350° C. FIG. 7 illustrates proportions of crystalline phases with respect to test specimens obtained by firing the molded products at 1,300° C., and FIG. 8 illustrates proportions of crystalline phases with respect to test specimens obtained by firing the molded products at 1,350° C. The vertical axis represents the proportion of each crystalline phase, and the horizontal axis represent mass % of $K_2O$.

It is found that the peak intensities of Cristobalite and quartz when no potassium carbonate is added (Comparative Example 2) are still higher than those of Example 1. This means that the amount of the glass phase in the refractory brick is small, and accordingly a reaction with $Na_2O$ at the surface of the refractory brick to be used for a float bath bottom can not be suppressed. To such a material, potassium carbonate is added in an amount of 2, 3, 4 or 6% as calculated as $K_2O$ mass % after mixing, followed by firing, whereby the peak intensities of Cristobalite and quartz reduce in a case where the $K_2O$ content is 2, 3 or 4% (Example 2), and the reaction with $Na_2O$ as described in Example 1 is suppressed. If the potassium carbonate is added in an amount of 6% (Comparative Example 3) as calculated as $K_2O$ mass % after mixing, followed by firing, whereby reduction of the peak intensity of Mullite is remarkable, and the proportion of Mullite remarkably decreased to at most 20% as shown in FIGS. 7 and 8. Namely, the amount of the glass phase is in excess, and the high temperature properties of the refractory brick may be impaired. Accordingly, it is estimated that flaking phenomena can be suppressed by use of the float bath bottom refractory brick of Example 2.

INDUSTRIAL APPLICABILITY

The present invention is useful for production of a float bath bottom refractory brick, since high effect of suppressing flaking phenomena can be obtained.

The entire disclosure of Japanese Patent Application No. 2004-325473 filed on Nov. 9, 2004 including specification, claims and summary is incorporated therein by reference in its entirety.

What is claimed is:

1. A process for producing a float bath bottom refractory brick which comprises adding a potassium compound to a clayey material comprising, as represented by mass percentage based on the following oxides, from 30 to 45% of $Al_2O_3$ and from 50 to 65% of $SiO_2$, kneading, molding, firing and then crushing the material to obtain a granular refractory material, kneading the granular refractory material, molding it into a shape of a desired float bath bottom refractory brick, followed by firing, wherein the granular refractory material comprises a fine granular portion having a grain size of less than 90 μm, and the fine granular portion is controlled to result in that portion of the refractory brick obtained from said fine granular portion having, as represented by mass percentage based on the following oxides, a $K_2O$ content of from 2 to 4%, and a $Na_2O$ content of at most 1%, wherein the granular refractory material comprises from 20 to 60% mass % of the fine granular portion.

2. The process for producing a float bath bottom refractory brick according to claim 1, wherein a medium granular portion having a grain size of from 90 μm to 1 mm in the granular refractory material, is also controlled to result in that portion of the refractory brick obtained from said medium granular portion having, as represented by mass percentage based on the following oxides, a $K_2O$ content of from 2 to 4%, and a $Na_2O$ content of at most 1%.

3. The process for producing a float bath bottom refractory brick according to claim 2, wherein the granular refractory material comprises from 20 to 60 mass % of the medium granular portion.

4. A float bath bottom refractory brick having a composition which comprises, as represented by mass percentage based on the following oxides, from 30 to 45% of $Al_2O_3$, from 50 to 65% of $SiO_2$, at most 1% of $Na_2O$ and from 3 to 4% of $K_2O$, which brick is obtained from a granular refractory material comprising from 20 to 60% mass % of a fine granular portion having a grain size of less than 90 μm.

5. The float bath bottom refractory brick according to claim 4, which has at most 10% of a Cristobalite crystalline phase.

6. The float bath bottom refractory brick according to claim 4, which has at least 20% of a Mullite crystalline phase.

7. A float bath having a bottom made of the brick as defined in claim 4.

8. A process for producing plate glass, which comprises discharging molten glass floating on tin in a float bath and forming smooth plate glass therefrom, wherein the float bath is as defined in claim 7.

9. The process for producing a float bath bottom refractory brick according to claim 2, wherein a coarse granular portion having a grain size exceeding 1 mm is also controlled to result in all portions of the refractory brick, as represented by mass percentage based on the following oxides, having a $K_2O$ content of from 2 to 4%, and a $Na_2O$ content of at most 1%.

10. The float bath bottom refractory brick according to claim 4, which has a porosity of from 15 to 20%.

11. The float bath bottom refractory brick according to claim 4, which has a bulk specific gravity of from 2.1 to 2.3.

12. The float bath bottom refractory brick according to claim 4, which has compressive strength of from 30 to 70 MPa.

13. The process for producing a float bath bottom refractory brick according to claim 1, wherein the $K_2O$ content is from 3 to 4%.

14. The process for producing a float bath bottom refractory brick according to claim 2, wherein the $K_2O$ content is from 3 to 4%.

15. The process for producing a float bath bottom refractory brick according to claim 9, wherein the $K_2O$ content is from 3 to 4%.

* * * * *